(12) United States Patent
Furukawa et al.

(10) Patent No.: US 9,220,047 B2
(45) Date of Patent: Dec. 22, 2015

(54) NETWORK SYSTEM, NODE, PACKET FORWARDING METHOD, PROGRAM, AND RECORDING MEDIUM

(75) Inventors: Hiroshi Furukawa, Fukuoka (JP); Kei Mitsunaga, Fukuoka (JP)

(73) Assignee: Kyushu University, National University Corporation, Fukuoka (JP)

( * ) Notice: Subject to any disclaimer, the term of this patent is extended or adjusted under 35 U.S.C. 154(b) by 650 days.

(21) Appl. No.: 12/934,804

(22) PCT Filed: Mar. 30, 2009

(86) PCT No.: PCT/JP2009/056494
§ 371 (c)(1),
(2), (4) Date: Dec. 22, 2010

(87) PCT Pub. No.: WO2009/123112
PCT Pub. Date: Oct. 8, 2009

(65) Prior Publication Data
US 2011/0090835 A1    Apr. 21, 2011

(30) Foreign Application Priority Data
Mar. 31, 2008  (JP) ................................. 2008-089509

(51) Int. Cl.
*H04H 20/71*    (2008.01)
*H04W 40/06*    (2009.01)
(Continued)

(52) U.S. Cl.
CPC .............. *H04W 40/06* (2013.01); *H04W 40/22* (2013.01); *H04W 72/046* (2013.01); *H04W 84/18* (2013.01)

(58) Field of Classification Search
CPC ... H04W 72/046; H04W 84/18; H04W 40/06; H04W 40/22
USPC .......... 370/208, 238, 235, 312, 339, 428, 331, 370/315, 316, 278, 236, 457, 342, 389, 252, 370/437, 352–356
See application file for complete search history.

(56) References Cited

U.S. PATENT DOCUMENTS

2002/0024935 A1 *   2/2002   Furukawa et al. ............. 370/238
2003/0133457 A1 *   7/2003   Ono et al. ................... 370/395.4
(Continued)

FOREIGN PATENT DOCUMENTS

EP        1185037       3/2002
JP       2002-94442      3/2002
(Continued)

OTHER PUBLICATIONS

Mitsunaga, Kei et al. Dec. 15-17, 2008. "Application of directional antenna to wireless multihop network enabled by IPT forwarding" IEEE—Signal Processing and Communication Systems, 2008. ICSPCS 2008. 2nd International Conference. Retrieved on Oct. 17, 2012 from <http://ieeexplore.ieee.org/xpl/articleDetails.jsp?arnumber=4813741&tag=1>.*
(Continued)

*Primary Examiner* — Brian J Gillis
*Assistant Examiner* — Juan C Turriate Gastulo
(74) *Attorney, Agent, or Firm* — Rankin, Hill & Clark LLP

(57) ABSTRACT

There are proposed: a network system capable of realizing packet forwarding higher in packet forwarding efficiency than in conventional Intermittent Periodic Transmit (IPT) using omni-directional antennas; and the like. Directional antennas are applied to the IPT, and each of slave nodes waits for reception of downlink packets by a directional antenna for receiving the downlink packets in a reception waiting state therefor. Moreover, the downlink packets are treated like polling control signals, and uplink packets are transmitted at a reception time of the downlink packets, whereby a hidden node problem and a carrier sensing problem can be avoided. Furthermore, in accordance with routing protocol in which each of nodes changes directivity randomly by a route formation process, it becomes possible to form a more suitable route.

13 Claims, 14 Drawing Sheets

(51) Int. Cl.
　　　*H04W 40/22*　　(2009.01)
　　　*H04W 72/04*　　(2009.01)
　　　*H04W 84/18*　　(2009.01)

(56) References Cited

U.S. PATENT DOCUMENTS

| 2004/0014471 | A1 | 1/2004 | Weigand | |
|---|---|---|---|---|
| 2006/0242258 | A1* | 10/2006 | Ohtani | 709/216 |
| 2007/0086468 | A1* | 4/2007 | Hosein et al. | 370/395.4 |
| 2007/0232359 | A1* | 10/2007 | Pinheiro et al. | 455/562.1 |
| 2008/0037622 | A1* | 2/2008 | Kohyama | 375/232 |
| 2008/0253297 | A1* | 10/2008 | Hulbert | 370/252 |
| 2009/0034448 | A1* | 2/2009 | Miller et al. | 370/316 |
| 2009/0168687 | A1* | 7/2009 | Li et al. | 370/315 |

FOREIGN PATENT DOCUMENTS

| JP | 2006-319787 | 11/2006 |
|---|---|---|
| JP | 2007-151025 | 6/2007 |

OTHER PUBLICATIONS

Koichi Ebata, Hiroshi Furukawa, "A study on Number of Directional Antennas and Required Bandwidth for Wireless Base Node Repeater Network", IEICE Technical Report, Jul. 12, 2001, vol. 101, No. 195, pp. 91-96.
International Search Report Dated Apr. 28, 2009.
European search report dated Mar. 9, 2011.
Webpage of IEEE Xplore of "Application of Directional Antenna to Wireless Multihop Network Enabled by IPT Forwarding", Published on Dec. 15-17, 2008, 2 pages.
Front Cover of Papers of "2nd International Conference on Signal Processing and Communication Systems", ICSPCS' 2008, Dec. 15-17, 2008, 1 page.
Copyright Notice of papers of "2nd International Conference on Signal Processing and Communication Systems, ICSPCS' 2008", Dec. 15-17, 2008, 1 page.

* cited by examiner (a)

(b)

(a)

(b)

(c)

(a)

| FINAL TRANSMISSION DESTINATION | TRANSMISSION DESTINATION | ANTENNA NUMBER |
|---|---|---|
| NODE A | NODE B | A3 |
| NODE B | NODE B | A3 |
| NODE D | NODE D | A1 |
| NODE E | NODE D | A1 |
| NODE F | NODE F | A5 |
| NODE G | NODE F | A5 |

(b)

(a)

(b)

(a)

(b)

NETWORK SYSTEM, NODE, PACKET FORWARDING METHOD, PROGRAM, AND RECORDING MEDIUM

TECHNICAL FIELD

The present invention relates to a network system, a node, a packet forwarding method, a program, and a recording medium, and particularly, relates to a network system including one core node and a plurality of slave nodes, and the like.

BACKGROUND ART

In recent years, a wireless mesh network has attracted attention as a backhaul network of a low-cost mobile communication infrastructure. The inventors have so far proposed Intermittent Periodic Transmit (hereinafter, referred to as "IPT") that realizes packet forwarding with high forwarding efficiency in a multihop network in which a plurality of nodes are arranged (refer to Patent Documents 1 to 4).

Patent Document 1: Japanese Patent Laid-Open No. 2005-143046

Patent Document 2: Japanese Patent Laid-Open No. 2006-157501

Patent Document 3: Japanese Patent Laid-Open No. 2006-319787

Patent Document 4: Japanese Patent Application No. 2008-018337

DISCLOSURE OF THE INVENTION

Problems to be Solved by the Invention

However, in the IPT in Patent Documents 1 to 4, omni-directional antennas have been assumed (hereinafter, referred to as "Omni IPT"). Therefore, radio interference has occurred in a wide range, and further, frequency reuse efficiency (space spectrum efficiency) has inevitably been lowered.

In this connection, it is an object of the present invention to propose a network system and the like capable of realizing packet forwarding with higher packet forwarding efficiency as compared with that of the conventional Omni IPT system using the omni-directional antennas.

Means for Solving the Problems

In one embodiment, a network system comprises one core node and a plurality of slave nodes, wherein the core node transmits packets to the plurality of slave nodes periodically and intermittently, each of the slave nodes includes a plurality of directional antennas and an antenna control unit that activates all or a part of the plurality of directional antennas, and upon receiving downlink packets transmitted from the core node, if received downlink packets contain a downlink forwarding packet to be transmitted to another slave node, immediately generates a transmission event and forwards the downlink forwarding packets, and in a reception waiting state, the antenna control unit of each of the slave nodes activates at least one directional antenna among the plurality of directional antennas, the at least one directional antenna serving for receiving the downlink packets directly or through another slave node.

In one embodiment, each of the slave nodes includes communication control unit that, in a case of receiving the downlink packets, when the slave node has uplink packets to be transmitted to the core node present, transmits the uplink packets to the node that has transmitted the downlink packets by using the directional antenna that has received the downlink packets.

In one embodiment, in each of the slave nodes, the antenna control unit activates only one of the plurality of directional antennas, and transmits and receives downlink packets, in a case where the downlink forwarding packets are contained in the received downlink packets, if the directional antenna for receiving the downlink packets and a directional antenna for transmitting the downlink forwarding packets directly or through another slave node to the slave node of a forwarding destination of the downlink forwarding packets are the same, the antenna control unit keeps on activating the directional antenna, and if the directional antenna for receiving the downlink packets and the directional antenna for transmitting the downlink forwarding packets directly or through another slave node to the slave node of the forwarding destination of the downlink forwarding packets are different, the antenna control unit activates the directional antenna for transmitting the downlink forwarding packets directly or through another slave node to the slave node of the forwarding destination of the downlink forwarding packets in place of the directional antenna for receiving the downlink packets, the communication control unit forwards the downlink forwarding packets by using the directional antenna activated by the antenna control unit, and waits for receiving uplink packets transmitted from the slave node as the forwarding destination, and after waiting for receiving the uplink packets, the antenna control unit activates, for the reception waiting state, the directional antenna for receiving the downlink packets.

In one embodiment, in a case where the core node transmits two downlink packets continuously and directly transmitted to the same slave node, the core node transmits the latter downlink packet after a certain fixed time period elapses, the fixed time period being equal to or more than a time period between a time when the former downlink packet is transmitted to the slave node and a time when the slave node that has directly received the former downlink packet ends communication processing with another slave node.

In one embodiment, the antenna control unit activates the directional antenna for receiving the downlink packets and uplink packets to be transmitted to the core node.

In one embodiment, each of the core node and the slave nodes includes a plurality of radio transceivers, and different radio transceivers are assigned for the transmission and reception of the downlink packets and for the transmission and reception of uplink packets to be transmitted to the core node.

In one embodiment, each of the slave nodes includes table management unit that manages information regarding the directional antennas for transmitting and receiving packets to and from other nodes and communication control unit that controls the transmission and reception of packets, the core node transmits route formation packets, and in each of the slave nodes, the antenna control unit waits for the reception while periodically changing the activated directional antenna, in a case of having received the route formation packet, the table management unit determines whether or not to update the managed information based on a communication status of the received route formation packet, and if the managed information has been determined to be updated, updates information for transmitting packets to the core node, and in a case where the table management unit has updated the information, the communication control unit transmits route formation packets by using all or a part of the plurality of directional antennas.

In one embodiment, the core node includes a plurality of directional antennas, antenna control unit that activates all or a part of the plurality of directional antennas and table management unit that manages information regarding the directional antennas for transmitting and receiving packets to and from other nodes, the core node transmits the route formation packets by using all or a part of the plurality of directional antennas, and waits for the reception by using the directional antennas used for transmitting the route formation packets, the slave node, in a case where the table management unit has updated the information, transmits the information managed by the table management unit to a transmission source of the received route formation packet, and the slave node, after the communication control unit transmits the route formation packets, waits for the reception by using the directional antenna used for transmitting the route formation packets, and the core node and the slave node, in a case of having received the managed information from a node that has received the transmitted route formation packet, update the information managed by the table management unit.

In one embodiment, a node receives packets transmitted periodically and intermittently from a predetermined node on a network. The node comprises, a plurality of directional antennas and antenna control unit that activates all or a part of the plurality of directional antennas, wherein in a reception waiting state, the antenna control unit activates at least one directional antenna among the plurality of directional antennas, the at least one directional antenna serving for receiving packets directly or through another node, the packets having transmitted periodically and intermittently from the predetermined node.

In one embodiment, one aspect of the invention relates to a packet forwarding method in a network system including a plurality of slave nodes and a core node that transmits packets to the plurality of slave nodes periodically and intermittently, wherein each of the slave nodes includes a plurality of directional antennas and antenna control unit that activates all or a part of the plurality of directional antennas, and the packet forwarding method comprises allowing the antenna control unit of each of the slave nodes to activate, in a reception waiting state, at least one directional antenna among the plurality of directional antennas, the at least one directional antenna serving for receiving, directly or through another slave node, packets transmitted from the core node.

Another aspect of the invention relates to a program for allowing a computer including a plurality of directional antennas to function.

Yet another aspect of the invention relates to a recording medium for recording the program.

Note that the core node may periodically transmit the packets to the slave nodes.

Moreover, each of the nodes may operate as an access point that has a plurality of terminals connected thereunder, and forwards uplink packets issued from the plurality of terminals or downlink packets directed to the terminals.

Furthermore, in the case where each of the nodes includes a plurality of radio transceivers, different channels may be assigned to these radio transceivers. In this case, the channels may be assigned based on an interference reception level. Moreover, two types of priorities, which are uplink priority and downlink priority, may be set for these radio transceivers, and the radio transceivers may be selected based on these priorities.

Effects of the Invention

A description is made of effects of the present invention with reference to FIGS. 14(a) to 14(c). First, enhancement of the frequency reuse efficiency can be achieved by suppressing the interference by applying the directional antennas. As shown in FIG. 14(a), for example, in point-to-point communication given directivity in a horizontal direction, the radio wave radiated in a vertical direction can be suppressed. Therefore, the interference with the forwarding node groups can be reduced out of the horizontal plane where the two communicating nodes are present.

However, two problems are caused by applying the directional antennas.

One of the problems is a "hidden node problem". The hidden node problem is described with reference to FIG. 14(b). In the case where a node $\alpha_1$ and a node $\gamma_1$ perform transmission to a node $\beta_1$, when the omni-directional antennas are applied, the node $\alpha_1$ and the node $\gamma_1$ can usually recognize the presence of each other by carrier sensing, and accordingly, in the case where one of the nodes is making communication with the node $\beta_1$, the other node does not interrupt the communication. However, as shown in FIG. 14(b), when the directional antennas are applied, the node $\alpha_1$ and the node $\gamma_1$ cannot sense a radio signal of each other, and there is a possibility that, in the case where one of the nodes is making communication with the node $\beta_1$, the other node may interrupt the communication. This problem occurs also when the omni-directional antennas are applied, and this is referred to as the "hidden node problem". When the directional antennas are applied, the hidden node problem becomes significant, and this is referred to as a "directional hidden node problem". In particular, in the wireless multihop communication in which the plurality of nodes are arranged in a wide range, the presence of the hidden nodes gives a serious influence upon the communication.

The other of the problems is a "carrier sensing failure problem". The carrier sensing failure problem is described with reference to FIG. 14(c). It is assumed that each of the nodes performs the forwarding by directional antennas having a specific directional pattern. Now, a case is considered where a node $\gamma_2$ attempts to forward packets toward a node $\beta_2$ in a transmitting state. Owing to a directional pattern of the node $\beta_2$, the node $\gamma_2$ cannot detect a carrier signal of the node $\beta_2$. As a result, though the node $\beta_2$ is in the transmitting state, the node $\gamma_2$ transmits data packets to the node $\beta_2$. However, the node $\beta_2$ cannot receive the data packets, and accordingly, the packet forwarding by the node $\gamma_2$ fails. As described above, the directional antennas are applied, whereby, in some case, it cannot be detected whether or not the transmission destination node is in the transmitting state, causing a failure of the packet forwarding. This is referred to as the "carrier sensing failure problem". This problem cannot be solved to whichever direction the transmission source node $\gamma_2$ may switch the antennas.

In accordance with the present invention, the interference on the route is suppressed by applying the directional antennas. Moreover, directional antennas for receiving the downlink packets are activated in the reception waiting state, whereby the downlink packets are received without exception. Furthermore, in one embodiment, the IPT is applied, whereby the downlink forwarding packets are treated like the polling control signals, and the core node manages flows of uplink and downlink packet forwarding. By the application of the IPT, the directional hidden node problem and the carrier sensing failure problem can be avoided.

Moreover, in accordance with the present invention, larger enhancement of the packet forwarding efficiency becomes realizable as compared with the forwarding characteristics by the conventional Omni IPT. In particular, in Multi-antenna Selection IPT Forwarding, it is confirmed that throughput performance is improved by 7.5% and the packet loss rate is improved by 42%. Furthermore, in Fast Antenna Selection IPT Forwarding, the throughput performance is improved by 14.1%, and the packet loss is improved by 86% or more (the packet loss rate is 0.05% or less).

Moreover, in the conventional route formation algorism in which the omni-directional antennas are assumed, the case where the route cannot be formed well owing to the hidden node problem has occurred frequently. In some instances, each of the nodes changes the directivity at random in the route formation process, whereby it becomes possible to form a more suitable route.

Figure 1:
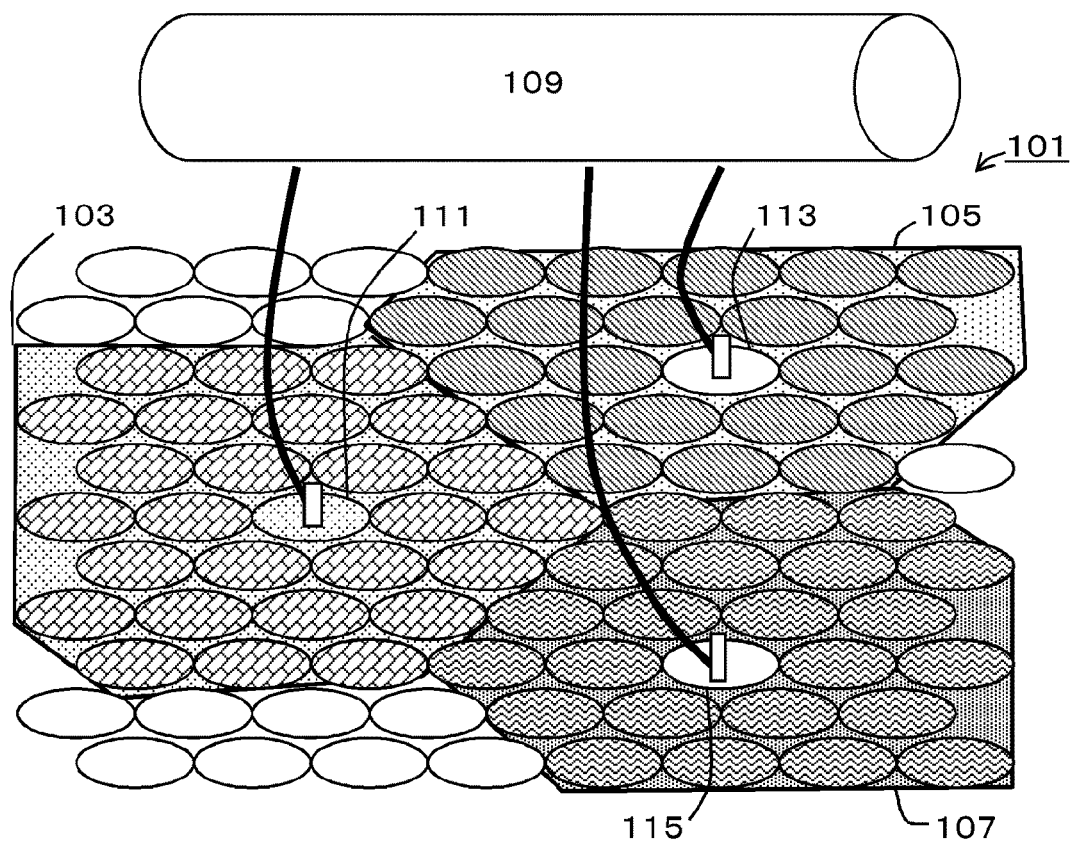
FIG. 1 is a view showing an example of a wireless mesh network.

DESCRIPTION OF REFERENCE NUMERALS 1 core node
3 control unit
$5_1, \ldots, 5_N$ directional antenna
7 antenna control unit
11 table management unit
17 communication control unit
21 core node
23 control unit
$25_1, \ldots, 25_N$ directional antenna
27 antenna control unit
31 table management unit
37 communication control unit

BEST MODE FOR CARRYING OUT THE INVENTION

A description is made below of embodiments of the present invention with reference to the drawings. Note that the present invention is not limited to these embodiments.

Embodiment 1

FIG. 1 is a view showing an example of a wireless mesh network. In FIG. 1, a wireless mesh network 101 includes mesh clusters 103, 105, and 107. Each of the mesh clusters includes a plurality of nodes. Each of the nodes is an element that composes the network, and have the function of an access point. The plurality of nodes are capable of communicating with one another, and are connected to one another in a so-called mesh manner. Core nodes 111, 113, and 115 are contained in the mesh clusters 103, 105, and 107, respectively. The core nodes 111, 113, and 115 are source nodes connected to a wireline core network 109 as an external network.

In the mesh clusters, nodes other than the core nodes are hereinafter referred to as slave nodes. Moreover, the direction from the core nodes toward the respective slave nodes is defined as downlink, and the direction reverse thereto is defined as uplink. Moreover, packets transmitted from the core nodes to the slave nodes are referred to as downlink packets, and packets transmitted from the slave nodes to the core nodes are referred to as uplink packets.

FIGS. 2(a) and 2(b) are schematic block diagrams of a core node 1 and a slave node 21 according to the embodiments of the present invention. Directional MAC protocol of this embodiment has two feature points. One of them is packet forwarding protocol by IPT, to which directional antennas are applied, and the other is routing protocol in a system to which the directional antennas are applied.

A configuration of the core node 1 is described with reference to FIG. 2(a). The core node 1 includes a control unit 3 that controls operations of the core node 1. Moreover, the core node 1 includes: a plurality of directional antennas $5_1, \ldots,$ and $5_N$; and an antenna control unit 7 that controls activation/inactivation of the respective directional antennas $5_1, \ldots,$ and $5_N$. Furthermore, the core node 1 includes: a table storing unit 9 that stores a table to manage information of the slave nodes and the directional antennas, which are for transmitting and receiving the packets; and a table management unit 11 that manages the table stored in the table storing unit 9. Furthermore, the core node 1 includes: a transmission buffer 13 that stores the packets to be transmitted; a reception buffer 15 that stores the received packets; and a communication control unit 17 that controls the transmission and reception of the packets.

For example as described in Patent Documents 1 to 4, the core node 1 transmits the downlink packets periodically and intermittently. Specifically, based on the table stored in the table storing unit 9, the communication control unit 17 transmits a certain downlink packet by the directional antennas $5_1, \ldots,$ and $5_N$, which are activated by the antenna control unit 7, and thereafter, transmits a next downlink packet after passing through a transmission waiting state. In such a way, the communication control unit 17 transmits the downlink packets periodically and intermittently while defining, as a predetermined time period, a time period from a time of ending the transmitting of the downlink packet immediately before to a time of transmitting the next downlink packet. Moreover, the communication control unit 17 of the core node 1 receives the uplink packets from the slave nodes.

Figure 2:
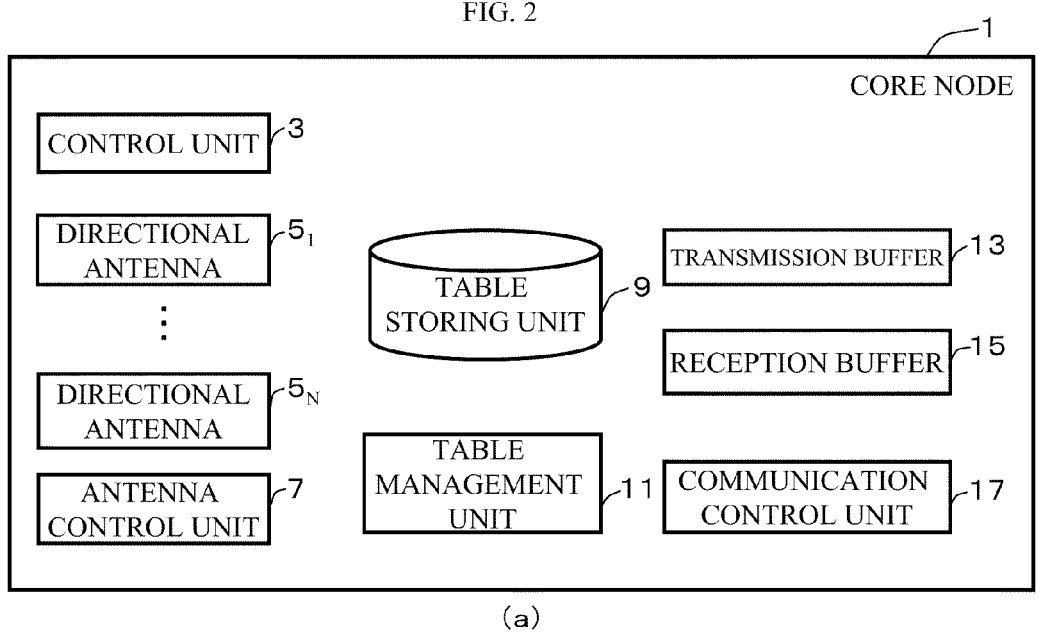
FIGS. 2(a) and 2(b) are schematic block diagrams of a core node 1 and a slave node 21 according to embodiments of the present invention.
Figure 2:
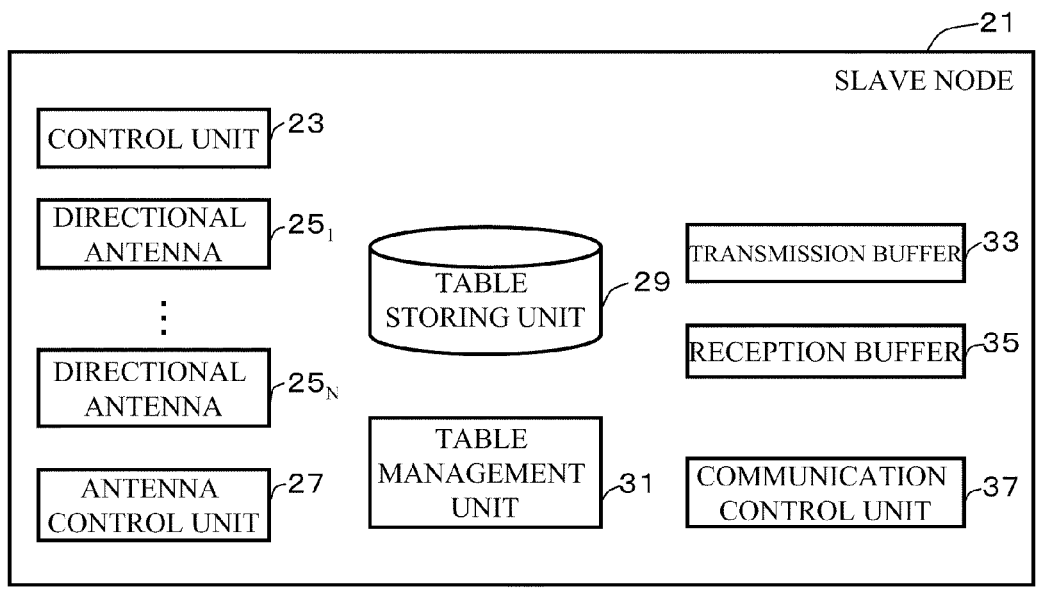

Next, a configuration of the slave node 21 is described with reference to FIG. 2(*b*). The configuration of the slave node 21 is similar to that of the core node 1 of FIG. 2(*a*). The slave node 21 includes: a control unit 23 that controls operations of the slave node 21; a plurality of directional antennas $25_1, \ldots,$ and $25_N$; an antenna control unit 27 that controls activation/inactivation of the respective directional antennas $25_1, \ldots,$ and $25_N$; a table storing unit 29 that stores a table to manage information of the core node, other slave nodes, and the directional antennas, which are for transmitting and receiving the packets; a table management unit 31 that manages the table stored in the table storing unit 29; a transmission buffer 33 that stores the packets to be transmitted; a reception buffer 35 that stores the received packets; and a communication control unit 37 that controls the transmitting and reception of the packets.

Based on the table stored in the table storing unit 29 and using the communication control unit 37, the slave node 21 performs the transmission and reception of the uplink packets and the downlink packets with the other nodes by the directional antennas $25_1, \ldots,$ and $25_N$ activated by the antenna control unit 27.

In the slave node 21, in a reception waiting state, being a state for receiving the downlink packets, the antenna control unit 27 activates at least the directional antenna for receiving the downlink packets among the directional antennas j $25_1, \ldots,$ and $25_N$ based on the table stored in the table storing unit 29. In such a way, it becomes possible to receive the downlink packets without exception by using the directional antenna.

In particular, for example as described in Patent Documents 1 to 4, in the case where downlink packets, which are directed to another slave node and are to be forwarded thereto, are contained in the received downlink packets, the communication control unit 37 generates a transmission event at the time of having received the downlink packets, and performs the forwarding for the downlink packets.

Moreover, if the uplink packets are present in the transmission buffer 33 in the case of having received the downlink packets, the communication control unit 37 transmits the uplink packets, which are present in the transmission buffer, to the node that has transmitted the downlink packets, by using the directional antenna that has received the downlink packets.

As described above, by paying attention to that the IPT method treats the downlink packets like the polling control signals, it becomes possible for the core node to manage flows of uplink and downlink packet forwarding. For example, the core node can transmit the downlink packets periodically and intermittently so that the downlink packets reach each of the slave nodes while each of the slave node is in the reception waiting state.

In accordance with the packet forwarding protocol as described above, even in the case where the antenna control unit 7 performs the uplink and downlink packet forwarding by partially activating the directional antennas $5_1, \ldots,$ and $5_N$, and particularly, by activating only one thereof, the directional hidden node problem and the carrier sensing failure problem are avoided. And larger enhancement of the packet forwarding efficiency becomes realizable as compared with the forwarding characteristics by the conventional Omni IPT. Moreover, the uplink and downlink packet forwarding is performed by partially activating the plurality of directional antennas, whereby it also becomes possible to reduce power consumption to a large extent.

Moreover, in accordance with the routing protocol in which each of the nodes changes the directivity randomly in the route formation process, the table management unit 11 and the table management unit 31 update the tables stored in the table storing unit 9 and the table storing unit 29. In this routing protocol, forwarding route packets are forwarded from the core node to the respective slave nodes, radio propagation path losses of the respective routes are calculated, a route in which the radio propagation path loss is minimum is selected, and the forwarding route packets are forwarded while the nodes periodically switch their directional antennas. By this routing protocol, it becomes possible to form a route, in which path losses become minimum, without information of the nodes' positions, and it becomes possible to autonomously select a directional antenna capable of forwarding the packets at a minimum path loss at the transmission time thereof.

Subsequently, the operations of the core node 1 and the slave node 21 in FIGS. 2(*a*) and 2(*b*) are specifically described with reference to FIGS. 3(*a*) to 9(*b*).

Figure 3:
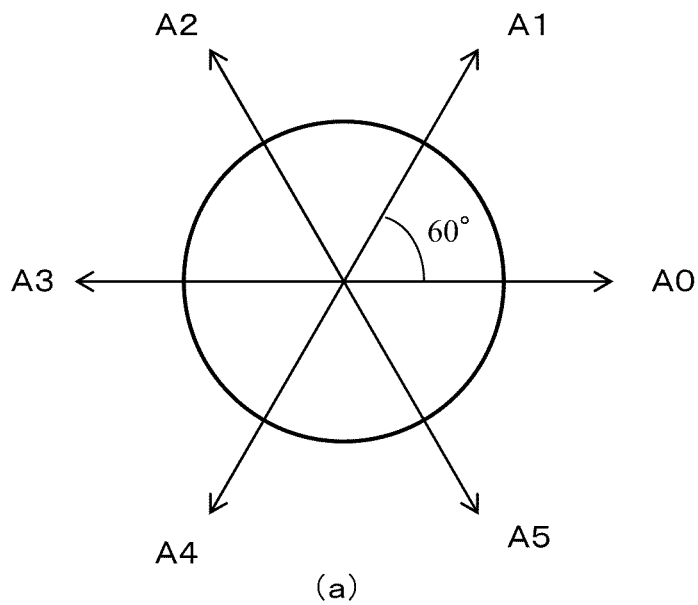
FIG. 3(a) is a view showing an example of arrangement of directional antennas of each node in this embodiment.
FIGS. 3(b) and 3(c) are views showing an example of a structure of the node.
Figure 3:
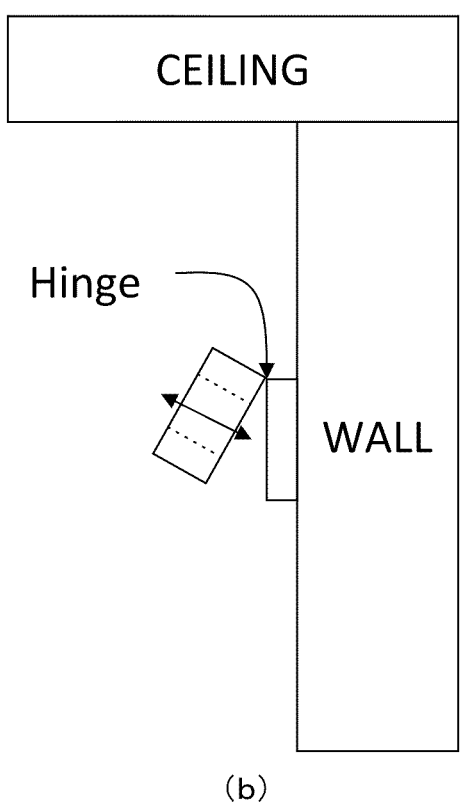
Figure 3:
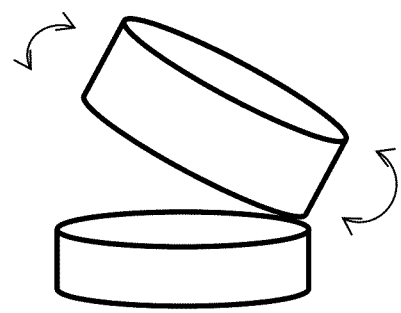

FIGS. 3(*a*) to 3(*c*) are views showing arrangement of the directional antennas of each node in this embodiment. The plurality of directional antennas in this embodiment have the same horizontal directivity, and are arranged while being given an angle offset on a horizontal plane. In the following, as an example of the above, as shown in FIG. 3(*a*), six directional antennas having a directional pattern with half width of 60 degree are arranged so that the directional antennas adjacent to one another can make an angle of 60°, and are given antenna numbers A0, . . . , and A5 counterclockwise. Note that, as shown in FIGS. 3(*b*) and 3(*c*), the node may be attached to a wall, may have a structure in which an attached portion and an antenna-added portion are connected to each other by a hinge to thereby enable rotation of the antenna-added portion, and may have such a mechanism that can adjust directions of the directional antennas in terms of hardware.

In the case where the directional antennas are applied, one node is equipped with a plurality of antennas different in major axis of antenna beam from one another (see FIG. 3(*a*)). Therefore, route cost is also changed depending on the selected antenna. In order to minimize the route cost from a viewpoint of the whole of the system, it is important as to which directional antenna each node should select.

Figure 5:
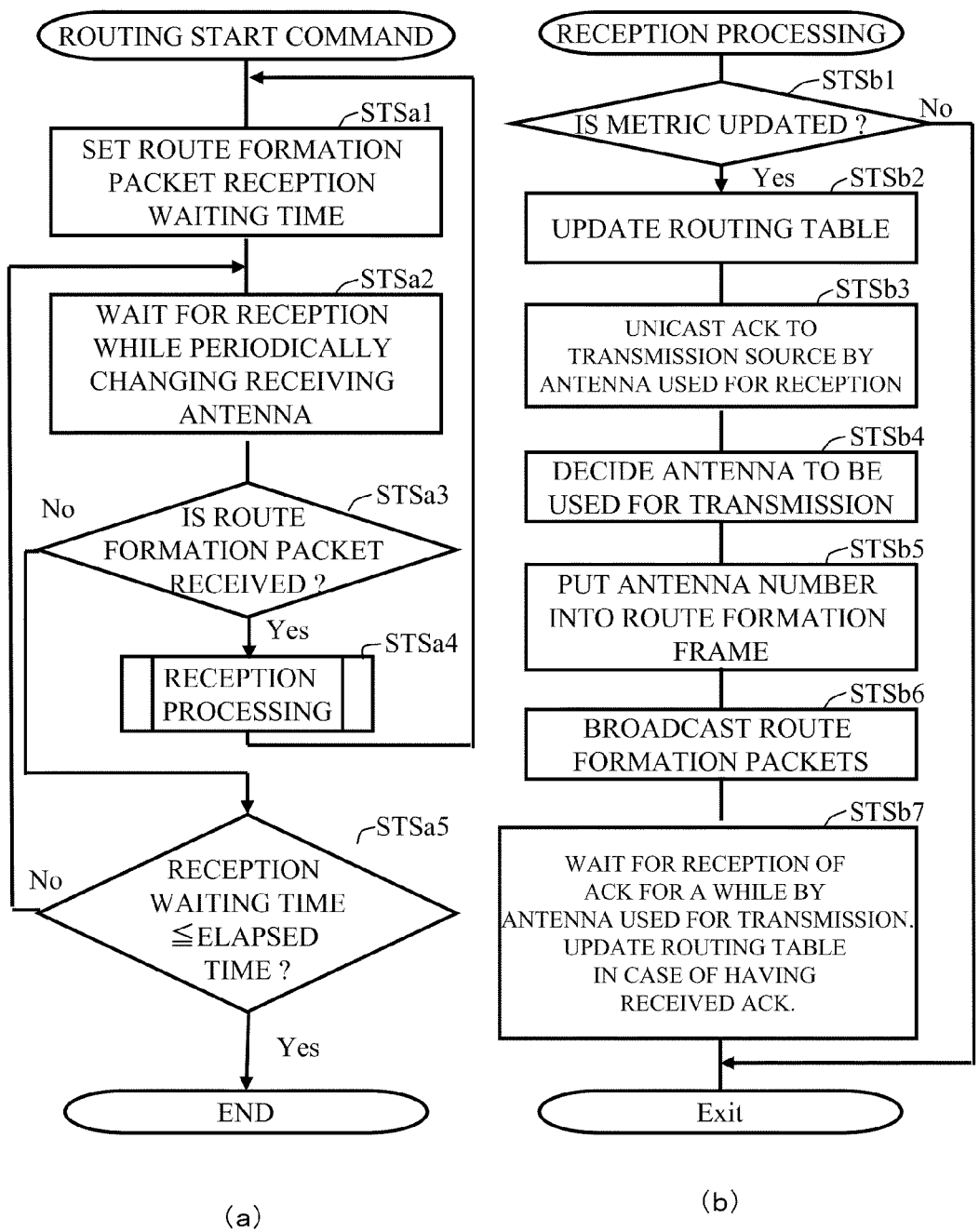
FIGS. 5(a) and 5(b) are flowcharts showing an example of processing of the slave node 21 in the routing protocol of this embodiment.
Figure 6:
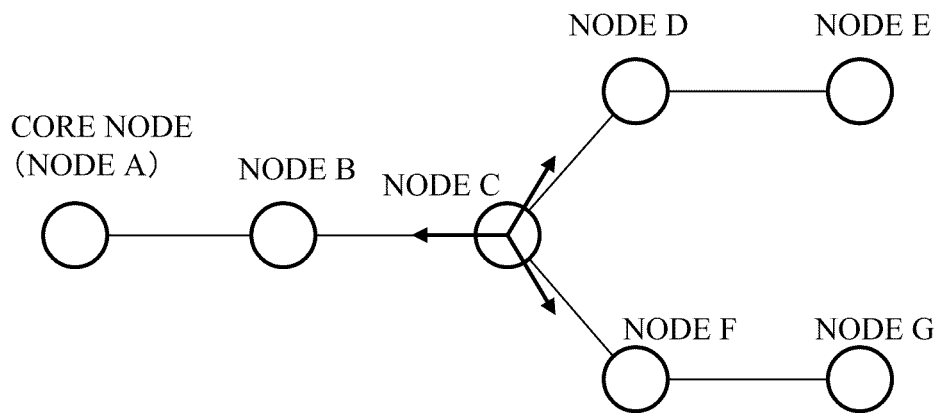
FIGS. 6(a) and 6(b) are diagrams showing an example of a configuration of a routing table in the routing protocol of this embodiment.

The routing protocol of this embodiment is described with reference to FIGS. 4 to 6(*b*). Fundamentals of the routing protocol in this embodiment are in formation of such a forwarding route that the route cost (for example, the sum of the path losses, the number of hops, and the like; hereinafter, referred to as a "metric") from the core node to the respective slave nodes can be minimum. The routing protocol of this embodiment is characterized in that the forwarding losses are applied as the metric, and each of the slave nodes periodically switches the directional antennas during a routing period. Therefore, by the routing protocol of this embodiment, it becomes possible for each of the nodes to autonomously select a directional antenna with a low metric, and it becomes possible to form a more suitable forwarding route.

Figure 4:
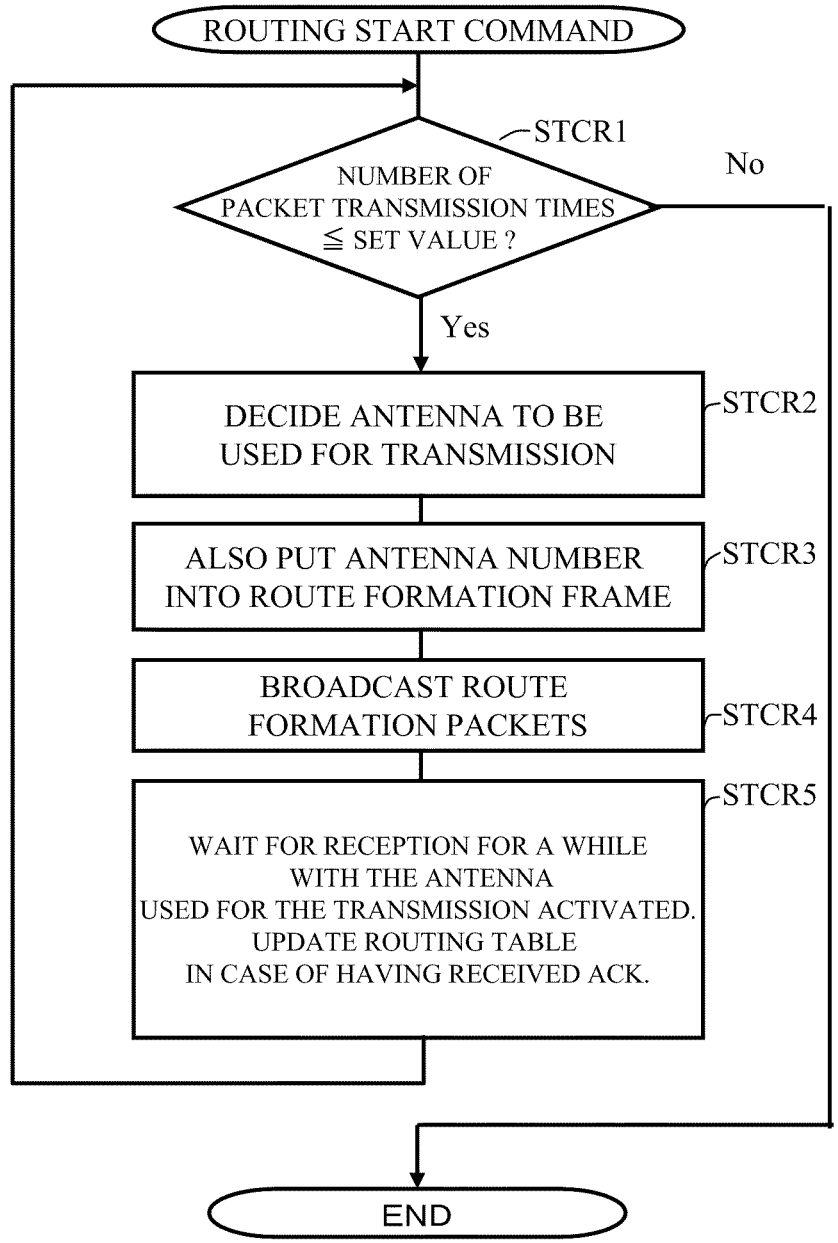
FIG. 4 is a flowchart showing an example of processing of the core node 1 in routing protocol of this embodiment.

FIG. 4 is a flowchart showing processing of the core node in the routing protocol of this embodiment. The processing of the core node in the routing protocol of this embodiment is described with reference to FIG. 4.

First, the operations of the core node 1 are described with reference to FIG. 4. The control unit 3 of the core node 1 determines whether or not the number of packet transmission times is a predetermined set value or less based on a routing start command (step STCR1). In the case where the number of packet transmission times is the predetermined set value or less, the control unit 3 decides the antenna to be used for the transmission (step STCR2), puts an antenna number of the decided antenna into a route formation frame (step STCR3), and broadcasts route formation packets (step STCR4). Then, the control unit 3 waits for the reception for a while with the directional antenna used for the transmission activated, and updates a routing table in the case of having received ACK (step STCR5). Then, the control unit 3 returns to the determination processing of step STCR1. In the case where it is determined that the number of packet transmission times is more than the predetermined set value in step STCR1, the processing is ended.

As described above, the core node randomly selects the transmission antennas and broadcasts the route formation packets more than once. The number of route formation packet transmission times is set in advance, and the number of times is changed in response to the number of nodes and the number of antennas provided therein. By a simulation, results have been obtained that it is sufficient to set the number of route formation packet transmission times at a square of the number of nodes in the case where the number of directional antennas of each node is six. And, in the case where the number of directional antennas is three, the number of route formation packet transmission times has been found to be enough just at one-tenth of the square.

Subsequently, the operations of the slave node 21 in the routing protocol of this embodiment are described with reference to FIGS. 5(a) and 5(b).

Referring to FIG. 5(a), the control unit 23 of the slave node 21 sets a route formation packet reception waiting time based on the routing start command (step STSa1). And the control unit 23 randomly selects only one directional antenna that receives the route formation packet, and waits for the reception while regularly changing such a receiving directional antenna (that is, while periodically changing the receiving directional antenna) (step STSa2). And then the control unit 23 determines whether or not to have received the route formation packet (step STSa3). In the case of having received the route formation packet, the control unit 23 performs reception processing (step STSa4), and returns to the processing of step STSa1. In the case of not having received the route formation packet, the control unit 23 determines whether or not an elapsed time is a predetermined reception waiting time or less (step STSa5). In the case where the elapsed time is smaller than the reception waiting time, the control unit 23 returns to the processing of step STSa2. In the case where the elapsed time is the reception waiting time or more, the control unit 23 ends the processing.

The reception processing in step STSa4 of FIG. 5(a) is specifically described with reference to FIG. 5(b). First, the control unit 23 calculates a metric by using path losses between the transmission source node and the reception nodes, compares the calculated metric with the metric held by the node of itself, and determines whether or not to update the metric (step STSb1). This is specifically described while taking, as an example, the case where the metric represents the path losses. For example, in the case of having received a new route formation packet, the control unit 23 of the slave node calculates a path loss L from the transmission source node to the node based on received power of the route formation packet. Then, the control unit 23 calculates a new metric that is computed by the sum of the path loss L and the metric shown in the received route formation packet. The new metric may be replaced from the existing one that is held by the slave node subject to a condition if the new metric is smaller than the existing one. As described above, if the calculated metric is smaller than the current metric, then the control unit 23 updates the routing table stored in the table storing unit 29 (step STSb2), and unicasts the ACK to the transmission source node by the antenna used for the reception (step STSb3). The ACK to be unicasted is allowed to contain an up-to-date routing table owned by the node unicasting the ACK. Then, the control unit 23 decides the antenna to be used for the transmission (step STSb4), puts an antenna number of the decided antenna into a route formation frame (step STSb5), and broadcasts route formation packets (step STSb6). Then, the control unit 23 waits for the reception for a while with the antenna used for the transmission activated. And, in the case of having received the ACK, the control unit 23 updates the routing table, which is owned by the slave node 21, based on the antenna number used for receiving the ACK and on the node number of the transmission source node of the ACK. Moreover, information of the up-to-date routing table owned by the transmission source node contained in the ACK is merged into the routing table (step STSb7). For example, in the case where the same destination node is already entered in the slave node 21, information contained in the ACK is given priority, and in the case where no destination is entered, a destination node is newly entered, and so on. As described above, the route formation packets are transmitted more than once by the core node 1, whereby such routing information is accumulated more in more upstream nodes. Then, the processing is ended. Meanwhile, in the case where it is determined not to update the metric in step STSb1, the processing is ended.

Next, FIG. 6(b) is a diagram showing an example of a configuration of each of the routing tables in step STSb2 and step STSb7 in FIG. 5(b). FIG. 6(a) is a diagram showing the formed forwarding route. For example, as shown in FIG. 6(b), in a slave node C, there is managed information regarding final transmission destinations, direct transmission destinations, and antenna numbers of the antennas for use in the transmission and the reception.

In step STSb2 in FIG. 5(b), the routing table is updated for a core node A and a node B based on the information of the received route formation packet. Specifically, in the case when a packet that should be finally forwarded to the core node A, the next destination of the packet is set to the node B, and the antenna number is set to A3. In the case when a packet should be finally forwarded to the node B, the next destination is set to the node B, and the antenna number is set to A3.

Moreover, in step STSb7 in FIG. 5(b), in the case when a packet should be finally forwarded to the node D, based on the antenna that has received the ACK and on the ACK received from the node D, the next destination is set to the node D, and the antenna number is set to A1, and in the case when a packet should be finally forwarded to the node E, the next destination is set to the node D and the antenna number is set to A1.

Also in the case where the ACK is received from the node F, then in a similar way to the above, in the case when a packet should be finally forwarded to the node F, the next destination is set to the node F, and the antenna number is set to A5, and in the case when a packet should be finally forwarded to the node G, the next destination is set to the node F, and the antenna number is set to A5.

The routing protocol in this embodiment has been described above. If the routing protocol of this embodiment is applied, then the respective nodes select the appropriate antennas in an autonomous distributed manner without obtaining the positional information of the nodes, whereby the forwarding route can be formed while taking, as standards, the path losses, the number of hops and so on.

Note that all or a part of the directional antennas may be selected, for example, in step STCR2 in FIG. 4. The same is also applied to step STSb4 in FIG. 5(b). Moreover, the reception may be awaited by using all or a part of the directional antennas, for example, in step STCR5 in FIG. 4. The same is also applied to step STSb7 in FIG. 5(b).

Moreover, when the route formation is sufficiently made based on the routing protocol of this embodiment (for example, in such a case where a time sufficient for the route formation has elapsed), information regarding the formed route may be transmitted from a slave node (in particular, a slave node located at an end point) to the core node through slave nodes located upstream.

Furthermore, as will be described later, it is found that the application of the IPT enhances the performance to a large extent from data of characteristic results. However, the above-described routing protocol is not limited to the case of applying the IPT, but may be regarded as one in the general wireless mesh network shown in FIG. 1.

Subsequently, the packet forwarding protocol of this embodiment is described with reference to FIGS. 7 to 9(b).

Figure 7:
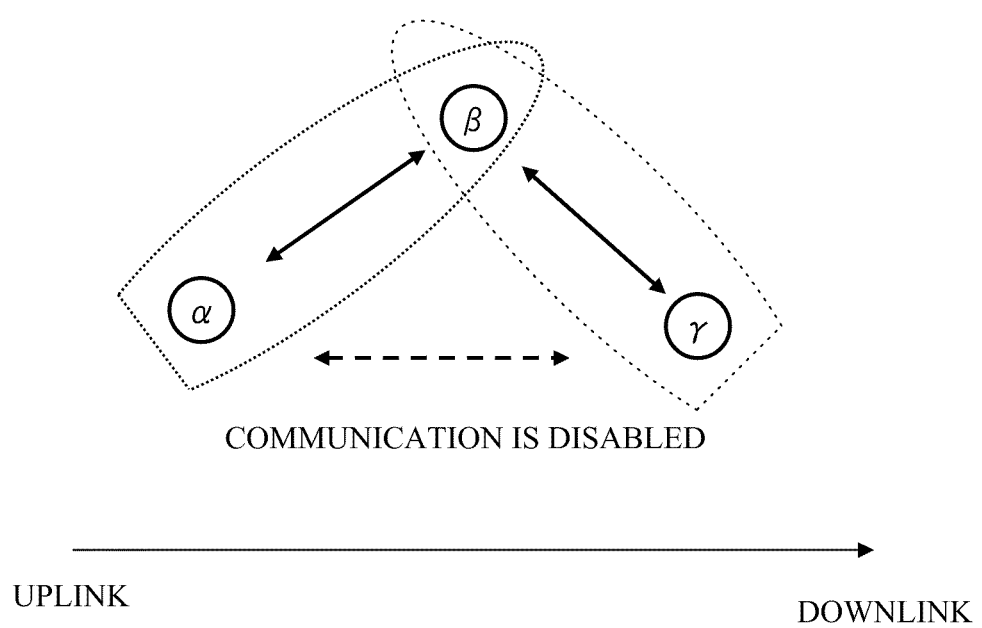
FIG. 7 is a view showing an outline to avoid a hidden node problem by MA-IPT.

First, Multi-antenna Selection Forwarding (hereinafter, referred to as "MAF") is described with reference to FIG. 7. The MAF is a method in which, in order to avoid packet collision by carrier sensing, the transmission and the reception are not performed only by one directional antenna, but a plurality of the antennas are selected simultaneously, and the transmission and the reception are performed by using these antennas. For wireless forwarding based on the MAF, the same access control as in the conventional omni-directional MAC protocol may be applied. By applying the MAF, it becomes possible for a transmitting node and a target node to sense a radio signal of each other, and the carrier sensing failure problem is avoided. However, the directional hidden node problem cannot be solved only in accordance with the MAF.

It is effective to apply the IPT in order to solve the directional hidden node problem. The IPT is applied to set an appropriate transmission cycle, whereby the hidden node problem can be avoided. This is specifically described by using FIG. 7. In an example shown in FIG. 7, the node $\alpha$, the node $\beta$, and the node $\gamma$ are located in order from the uplink to the downlink. The node $\alpha$ and the node $\gamma$ are in a directional hidden node relationship. The transmission cycle is adjusted so that packet transmission from the node $\alpha$ to the node $\beta$ and packet transmission from the node $\gamma$ to the node $\beta$ cannot be performed simultaneously, whereby the directional hidden node problem can be avoided. Hereinafter, packet forwarding protocol in which the IPT is combined with the MAF is referred to as Multi-antenna Selection IPT Forwarding (MA-IPT). By applying the MA-IPT, it becomes possible to avoid the directional hidden node problem. However, in the MA-IPT, the plurality of directional antennas are selected simultaneously, and accordingly, the interference suppression effect becomes smaller as compared with the case of always selecting one antenna.

Subsequently, Fast Antenna Selection Forwarding (hereinafter, referred to as "FAF") is described with reference to FIGS. 8, 9(a) and 9(b). The FAF is a packet forwarding method, in which only one directional antenna is always selected, and the transmission and reception processing is performed by switching the selected antenna at high speed. In such a way, it becomes possible to suppress the interference to the maximum.

In the FAF, with regard to the packet transmission, the directional antenna just needs to be selected with reference to the routing table in each node. However, with regard to the packet reception, it cannot be estimated from which neighboring node the packet is to be forwarded, and it cannot be decided which antenna is to be selected for waiting for the reception.

A forwarding route obtained by the routing protocol in this embodiment forms a tree structure. In this case, an uplink route of each slave node certainly becomes only one. In the FAF, each slave node selects the uplink directional antenna, and is left waiting for the reception. In such way, it becomes possible for each slave node to receive the downlink packets without exception. If a certain slave node receives a downlink packet, and the downlink packet is not directed to the node itself, then the slave node instantaneously switches to the directional antenna in a direction toward a downlink slave node to which the downlink packet is to be forwarded, and forwards the downlink packet to the downlink. After forwarding the downlink packet, the slave node does not instantaneously select the uplink directional antenna again for turning to the reception waiting state, but keeps on selecting the downlink directional antenna for a while, and receives the uplink packets from the downlink node during this period. Specifically, in the FAF, the uplink packets adopt a mode of so-called polling forwarding, in which the uplink packets are forwarded on the occasion of arrival of the downlink packet.

Figure 8:
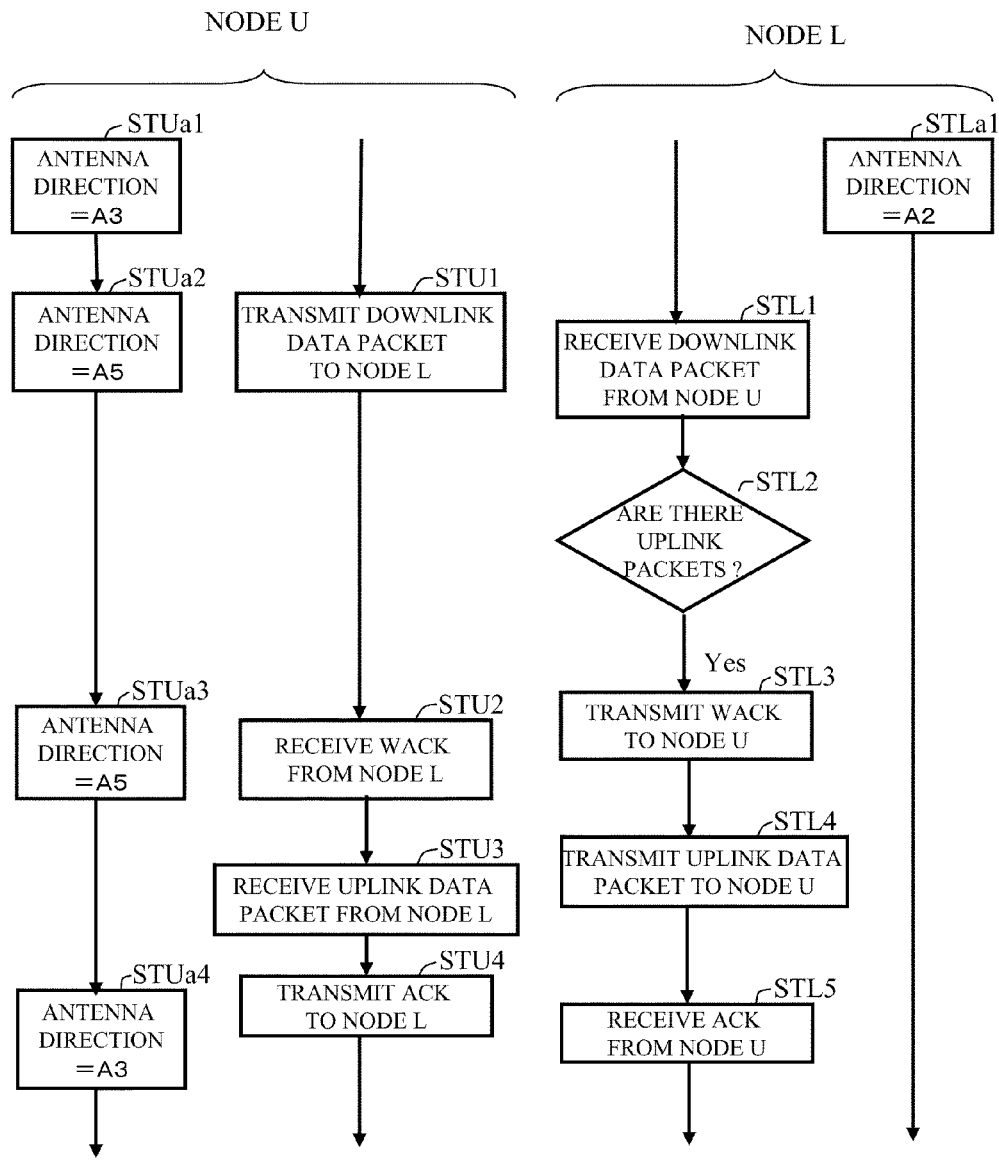
FIG. 8 is a diagram showing processing and antenna orientations in the respective nodes with regard to FAF.
Figure 9:
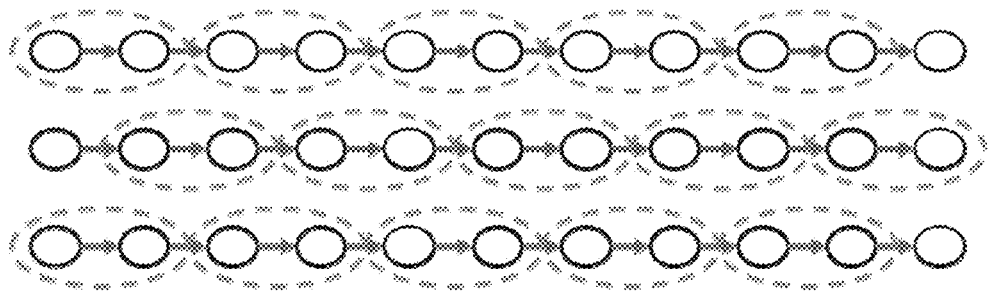
FIGS. 9(a) and 9(b) are diagrams showing transmission time intervals in the core node in FA-IPT.
Figure 9:
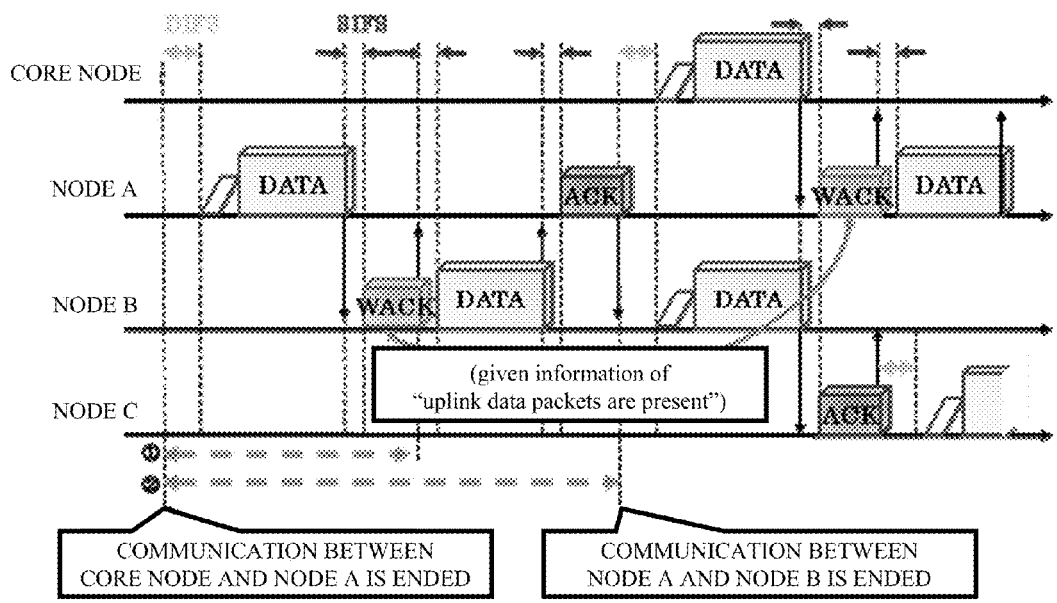

With regard to the FAF, the processing of the respective nodes and the orientations of the antennas are specifically described sequentially with reference to FIG. 8. It is assumed that a node U located in the uplink of node L. In the node U and the node L, as transmission buffers, transmission cues which adopt an input/output method of First-in First-out (FIFO) are prepared individually for the uplink packets and the downlink packet. Packets accumulated in the transmission cue for the uplink packets are not outputted until the downlink packet arrives there, that is, until a polling command from the core node arrives there. The node L does not forward the uplink packets until the downlink packet arrives there from the node U even if the node L has the uplink packets. In FIG. 8, the uplink directional antennas of the node U and the node L are denoted by reference symbols A3 and A2, respectively (steps STUa1·STLa1). The node U changes the effective directional antenna to that in an antenna direction A5 (step STUa2), and transmits the downlink packet to the node L (step STU1). The node L receives the downlink packet from the node U (step STL1), and determines whether or not the uplink packets are present (step STL2). In the case where the uplink packets are present, the node L transmits, to the node U, an ACK signal (Wait ACK (WACK) signal) with information of "uplink data packets are present" (step STL3), and after a backoff period, transmits the uplink packets toward the node U (step STL4). Upon receiving the WACK signal from the node L (step STU2), the node U does not change the antenna for the uplink (step STUa3), but waits for the reception of the uplink packets from the node L in a state as it is. After receiving the uplink packets from the node L (step STU3), the node U transmits the ACK signal to the node L, stores the received data packets in an uplink cue, changes the antenna to the uplink (step STUa4), and turns to the reception waiting state. The node L receives the ACK from the node U (step STL5).

By applying the FAF, the forwarding always becomes possible by one antenna, and an interference wave can be suppressed. However, only by the FAF, the directional hidden node problem or the carrier sensing failure problem cannot be avoided. It is effective to apply the IPT in order to solve the directional hidden node problem and the carrier sensing failure problem in the FAF. Hereinafter, packet forwarding protocol in which the IPT is combined with the FAF is referred to as Fast Antenna Selection IPT Forwarding (FA-IPT). By applying the FA-IPT, it becomes possible to avoid the directional hidden node problem and the carrier sensing failure problem.

FIGS. 9(a) and 9(b) are diagrams showing an outline of the FA-IPT. In the FAF, the uplink packet transmission adopts the mode of the polling forwarding. Therefore, it is possible to control occurrence timing of traffic in the network by the core node in a centralized manner. Hence, an appropriate transmission cycle is provided in the core node, thus making it possible to simultaneously cope with the carrier sensing failure problem and the directional hidden node problem.

A transmission time interval given by the core node in the FA-IPT is examined with reference to FIGS. 9(a) and 9(b). If the nodes are arranged linearly as shown in FIG. 9(a) and the directional antennas are applied, then radio interference in the opposite direction of the target node when viewed from each of the nodes themselves can be suppressed to a large extent, and accordingly, communication of a reuse cluster 2 becomes possible. Hence, in a network into which bi-directional traffic is interposed, as shown in FIG. 9(b), a time interval from an end of communication between the core node and the node A to an end of communication between the node A and the node B is appropriate to be set as the transmission cycle. However, the carrier sensing cannot be performed in the FA-IPT, and accordingly, if packet delay occurs in the network, the forwarding efficiency is lowered severely. Such time setting as the time interval from the end of the communication between the core node and the node A to the end of the communication between the node A and the node B is just a minimum value, and it is desirable to set a cycle having a margin.

Note that, with regard to the number of radio transceivers associated with the directional antennas, each of the core nodes and the slave nodes may be provided with a plurality of the radio transceivers. Moreover, different channels may be assigned to these radio transceivers. In this case, the channels may be assigned based on an interference reception level. Furthermore, two types of priorities, which are uplink priority and downlink priority, may be set for these radio transceivers, and the radio transceivers may be selected based on these priorities (refer to Patent Document 4).

Embodiment 2

Subsequently, characteristics of the directional MAC protocol of this embodiment are described by a simulation using two-dimensional node arrangement in which an actual environment is assumed.

Figure 10:
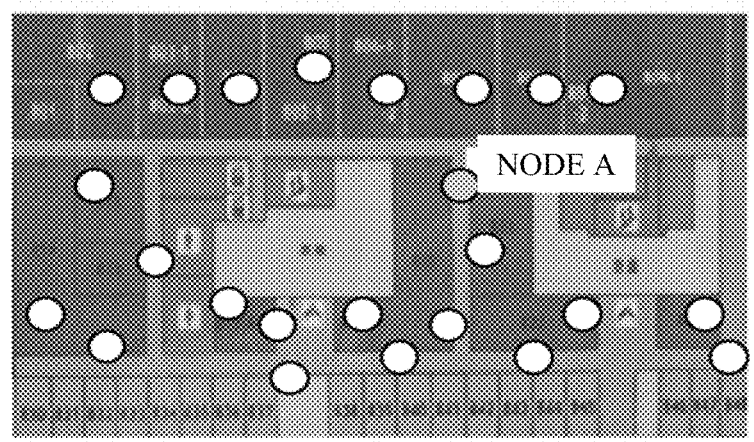
FIG. 10(a) is a view showing a sketch of a floor and a node arrangement model in a simulation.
FIG. 10(b) is a view showing a model of the directional antenna in the simulation.
Figure 10:
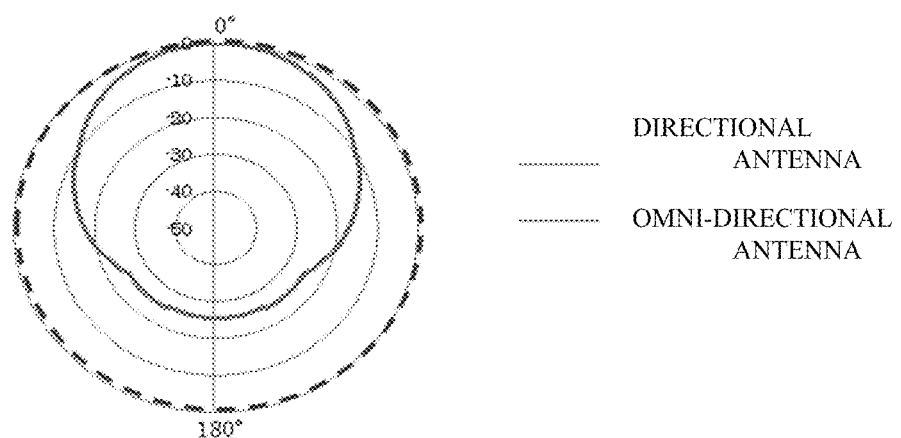

FIG. 11(a) is a view showing a sketch of a floor and a node arrangement model in the simulation. The node A is the core node, and 23 slave nodes are arranged. Moreover, FIG. 10(b) is a view showing a model of the directional antenna with half width of 60 degree. Six directional antennas, each of which is shown in FIG. 10(b), are arranged for one node (see FIG. 3(a)).

Conditions of the simulation are as follows.

First, with regard to a packet length, the data packet is set at 248 μs (equivalent to 1500 bytes at 54 Mbps), and the ACK is set at 24 μs. With regard to a channel model, a forwarding constant α is set equal to 2 up to 5 m, and is set equal to 3.5 at 5 m or more, shadowing is 12 dB per wall, and short-distance fading is not considered.

Moreover, modeling of MAC conforms to IEEE 8002.11, and the basic mode is adopted therefor. The number of retransmission times is set at seven. By random backoff, a forwarding waiting time (contention count) at the time of contention is given by a random integer within a range from 0 to a contention window length (CW length), and is set at a different value every time when the packet is forwarded. The CW length is increased as the number of retransmission times is increased. The minimum CW length is set at 4 SIFS, and the maximum CW length is set at 1024 SIFS.

With regard to modeling of PHY, required SINR is set at 10 dB, and it is assumed that the reception of the packet succeeds at a probability of 1 in the case where quality of the received packet is such a required value or more, and that the reception of the packet otherwise fails at a probability of 1.

With regard to a traffic model, a call is generated in the core node by the Poisson origination, and the number of packets per packet burst follows the log-normal distribution. The traffic in the downlink is set at 20 packets in average.

Based on the above-described conditions, comparison and evaluation are performed for the ODF, the MAF, the FAF, the Omini IPT, the MA-IPT, and the FA-IPT.

Figure 11:
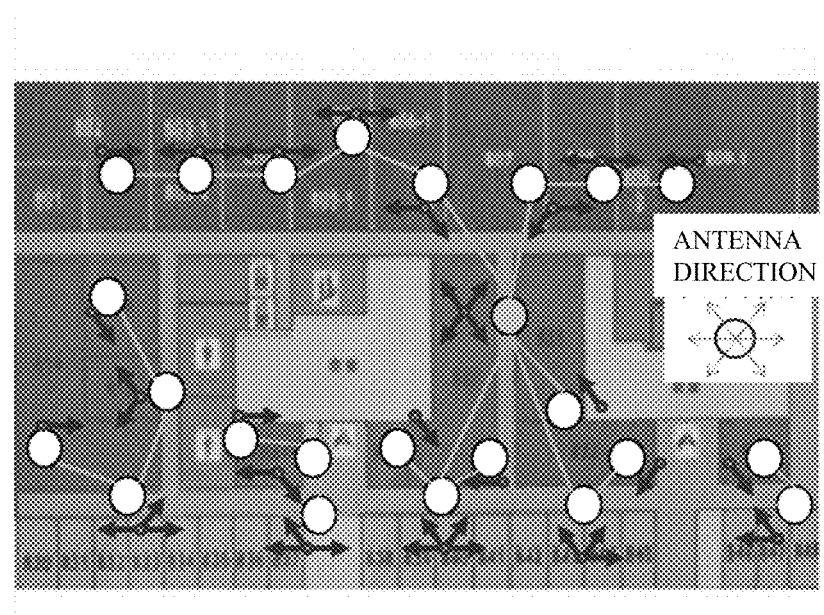
FIG. 11 is a view showing a simulation result of routes formed by the routing protocol of this embodiment and of antennas selected thereby.

FIG. 11 is a view showing a forwarding route formed by the routing protocol of this embodiment, and showing antennas selected thereby. The number of transmission times of the route formation packets is set at 500 times ($23^2$=529). In FIG. 11, arrows located around the respective nodes indicate the orientations and number of the antennas stored in the routing table. In the simulation of this embodiment, the antenna model is symmetrical, and the fading is not considered in the conditions. Therefore, the antenna directions in two points of each node and the communication node can be set to make a pair to face each other straightly. In FIG. 11, this condition is satisfied, and it is conceived that setting values were appropriate.

Figure 12:
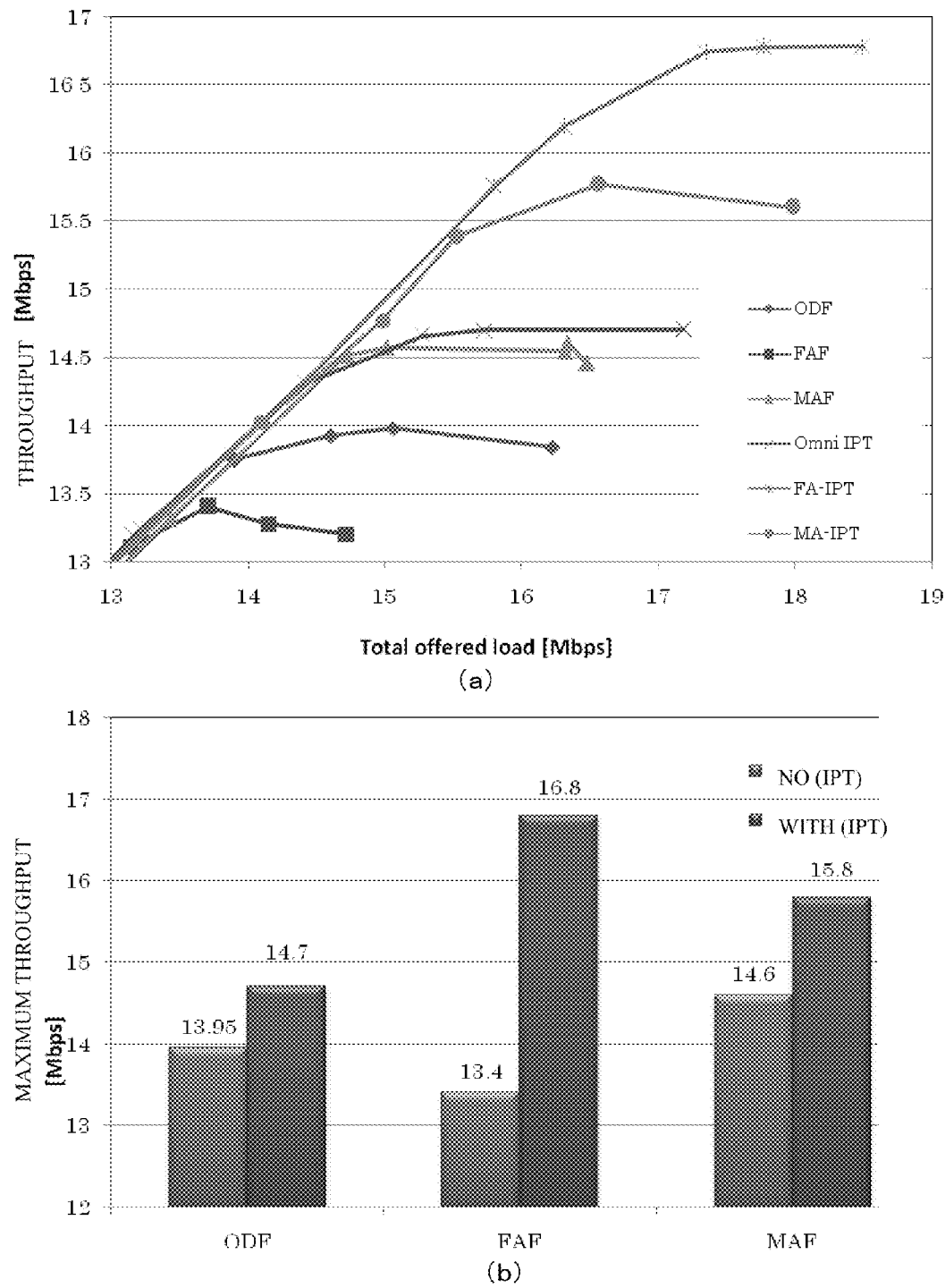
FIGS. 12(a) and 12(b) are graphs showing comparison among simulation results of throughput performances of ODF, the FAF, MAF, Omni IPT, the FA-IPT, and the MA-IPT.
Figure 13:
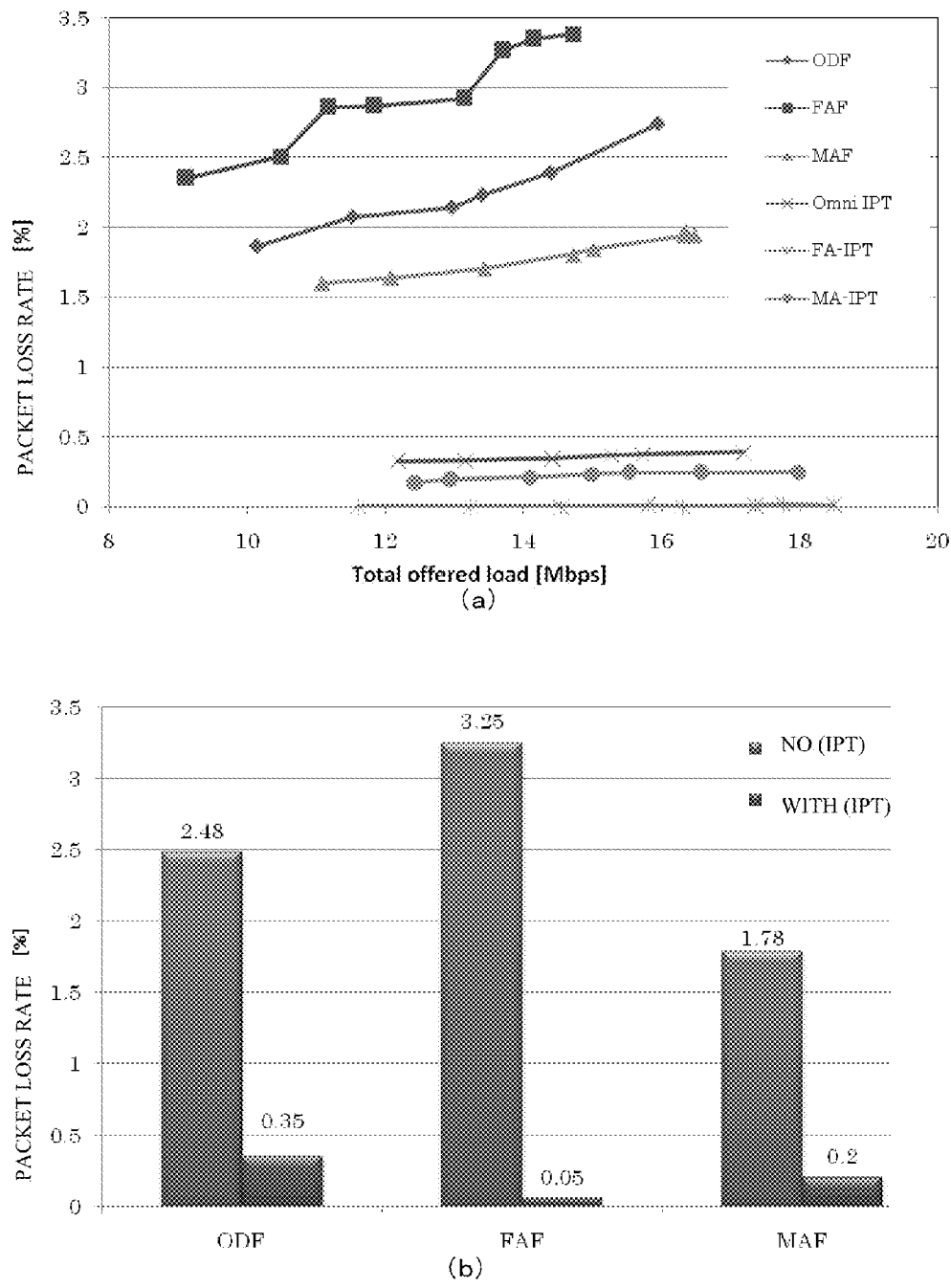
FIGS. 13(a) and 13(b) are graphs showing comparison among simulation results of packet loss rates of the ODF, the FAF, the MAF, the Omni-IPT, the FA-IPT, and the MA-IPT.
Figure 14:
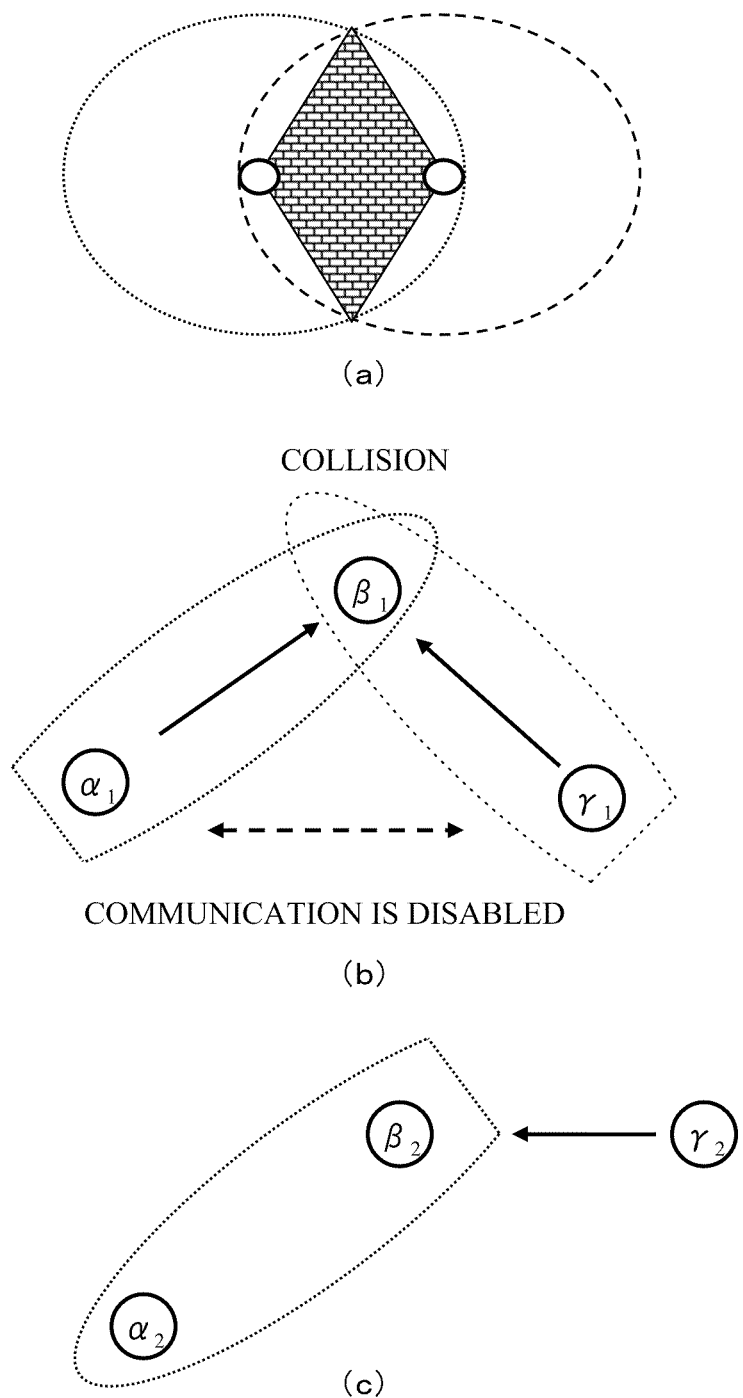
FIG. 14(a) is a view showing enhancement of frequency reuse efficiency, which is brought by applying the directional antennas.
FIG. 14(b) is a view showing an outline of the directional hidden node problem.
FIG. 14(c) is a view showing an outline of a carrier sensing failure problem.

FIGS. 12(a) and 12(b) are graphs showing comparison among throughput performances, and FIGS. 13(a) and 13(b) are graphs showing comparison among packet loss rates. Each axis of abscissas indicates traffic intensity. Here, the transmission time interval is set at 400 SIFS in the Omni IPT and the MA-IPT, and at 200 SIFS in the FA-IPT.

For the ODF, the FAF, and the MAF to which the IPT is not applied, the throughput performances and packet loss rates thereof are compared thereamong. Then, the FAF had the worst results in both of the throughput performance and the packet loss rate. These results in the FAF are conceived to be brought about because the forwarding efficiency is deteriorated by a double influence from the carrier sensing failure problem and the directional hidden node problem. In particular, the throughput of the ODF (omni-directional antenna/no IPT) is 13.95 Mbps, and the packet loss rate thereof is 2.48%, whereas the throughput of the FAF (directional antenna/no IPT) is 13.4 Mbps, and the packet loss rate thereof is 3.25%, and this indicates that there is a possibility that only the use of the directional antenna may not be sufficient for preventing the deterioration of the forwarding efficiency. On the contrary, the MAF is capable of solving the carrier sensing failure problem, and achieved the highest throughput and the lowest packet loss rate. However, even in the MAF, the influence of the directional hidden node problem is still present.

In particular, it is the FA-IPT that exhibited the highest throughput. Referring to FIG. 12(b), an improvement rate of the throughput, which is obtained by applying the IPT, is 25% (improvement rate of the FA-IPT from the FAF) in the FAF, which is extremely higher as compared with 5.4% (improvement rate of the Omni IPT from the ODF) in the ODF and 8.2% (improvement rate of the MA-IPT from the MAF) in the MAF. In particular, while the FAF was deteriorated in performance as compared with the ODF, a comparison result between the Omni IPT and the FA-IPT, to which the IPT was applied, became as follows. The throughput of the Omni IPT was 14.7 Mbps, and the packet loss rate thereof was 0.35%, whereas the throughput of the FA-IPT was 16.8 Mbps, and the packet loss rate thereof was 0.05%. As described above, the forwarding efficiency is improved such that the throughput is improved by as much as 14.1%, and that the packet loss rate is improved by as much as 86%.

Moreover, when the MA-IPT and the Omni IPT are compared with each other, then referring to FIGS. 12(a) and 12(b) and FIGS. 13(a) and 13(b), in the MA-IPT, the throughput was improved by 7.5% and the packet loss rate was improved by 42.9% with respect to those of the Omni IPT. The MA-IPT and the Omni IPT are equal to each other in MAC protocol. Therefore, it is interpreted that such a difference in packet forwarding efficiency directly represents the interference suppression effect brought by the application of the directional antennas.

Referring to FIGS. 12(a) and 12(b) and FIGS. 13(a) and 13(b), it is understood that how the IPT works differs among the ODF, the MAF, and the FAF. Such a difference is conceived to occur since problems to be solved differ among these. Specifically, the Omni IPT involves only the hidden node problem, the MA-IPT involves the hidden node problem and the directional hidden node problem, and the FA-IPT involves the hidden node problem, the directional hidden node problem and the carrier sensing failure problem. The FA-IPT that involves all the problems particularly obtains the benefit of the IPT, and further, obtains the results which are superior to those in the other methods.

The invention claimed is:

1. A network system comprising:
one core node; and
a plurality of slave nodes, wherein
the core node transmits data packets to the plurality of slave nodes periodically and intermittently,
each of the slave nodes includes:
a plurality of directional antennas;
communication control unit that, when the slave node has uplink data packets to be transmitted to the core node and then receives downlink data packets from an uplink node, transmits the uplink data packets to the uplink node that has transmitted the downlink data packets by using a directional antenna through which the downlink data packets were received; and
an antenna control unit that activates all or a part of the plurality of directional antennas, and
in a reception waiting state, the antenna control unit of each of the slave nodes activates at least one directional antenna serving for receiving the downlink data packets from the uplink node and does not forward the uplink data packets, and
upon receiving downlink data packets transmitted from the core node, when the slave node has the uplink data packets, the antenna control unit of the slave node transmits the uplink data packets to the uplink node that has transmitted the downlink data packets by using the directional antenna through which the downlink data packets were received, and if received downlink data packets contain a downlink forwarding data packet to be transmitted to another slave node, the antenna control unit of the slave node immediately generates a transmission event, activates at least one directional antenna serving for forwarding the downlink forwarding data packet, forwards the downlink forwarding data packet, receives uplink data packets, for the reception waiting state, activates the directional antenna for receiving the downlink data packets, and does not forward the uplink data packets.

2. The network system according to claim 1, wherein
in each of the slave nodes, the antenna control unit activates only one of the plurality of directional antennas, and transmits and receives downlink data packets,
in a case where the downlink forwarding data packets are contained in the received downlink data packets,
if the directional antenna for receiving the downlink data packets and a directional antenna for transmitting the downlink forwarding data packets directly or through another slave node to the slave node of a forwarding destination of the downlink forwarding data packets are the same, the antenna control unit keeps on activating the directional antenna, and
if the directional antenna for receiving the downlink data packets and the directional antenna for transmitting the downlink forwarding data packets directly or through another slave node to the slave node of the forwarding destination of the downlink forwarding data packets are different, the antenna control unit changes effective directional antenna to the directional antenna for transmitting the downlink forwarding data packets to the slave node of the forwarding destination of the downlink forwarding data packets,
the communication control unit forwards the downlink forwarding data packets by using the directional antenna activated by the antenna control unit, and waits for receiving uplink data packets transmitted from the slave node as the forwarding destination, and
after waiting for receiving the uplink data packets, the antenna control unit activates, for the reception waiting state, the directional antenna for receiving the downlink data packets.

3. The network system according to claim 2, wherein
in a case where the core node transmits two downlink data packets continuously and directly transmitted to the same slave node, the core node transmits the latter downlink data packet after a certain fixed time period elapses, the fixed time period being equal to or more than a time period between a time when the former downlink data packet is transmitted to the slave node and a time when the slave node that has directly received the former downlink data packet ends communication processing with another slave node.

4. The network system according to claim 1, wherein
the antenna control unit activates the directional antenna for receiving the downlink data packets and uplink data packets to be transmitted to the core node.

5. The network system according to claim 1, wherein
each of the core node and the slave nodes includes a plurality of radio transceivers, and
different radio transceivers are assigned for the transmission and reception of the downlink data packets and for the transmission and reception of uplink data packets to be transmitted to the core node.

6. The network system according to claim 1, wherein
each of the slave nodes includes:
table management unit that manages information regarding the directional antennas for transmitting and receiving data packets to and from other nodes; and
communication control unit that controls the transmission and reception of packets,
the core node transmits route formation packets, and
in each of the slave nodes, the antenna control unit waits for the reception while periodically changing the activated directional antenna, in a case of having received the route formation packet, the table management unit determines whether or not to update the managed information based on a communication status of the received route formation packet, and if the managed information has been determined to be updated, updates information for transmitting data packets to the core node, and in a case where the table management unit has updated the information, the communication control unit transmits route formation packets by using all or a part of the plurality of directional antennas.

7. The network system according to claim 6, wherein the core node includes:

a plurality of directional antennas;

antenna control unit that activates all or a part of the plurality of directional antennas; and table management unit that manages information regarding the directional antennas for transmitting and receiving packets to and from other nodes, the core node transmits the route formation packets by using all or a part of the plurality of directional antennas, and waits for the reception by using the directional antennas used for transmitting the route formation packets, the slave node, in a case where the table management unit has updated the information, transmits the information managed by the table management unit to a transmission source of the received route formation packet, and the slave node, after the communication control unit transmits the route formation packets, waits for the reception by using the directional antenna used for transmitting the route formation packets, and the core node and the slave node, in a case of having received the managed information from a node that has received the transmitted route formation packet, update the information managed by the table management unit.

8. A node that receives data packets transmitted periodically and intermittently from a predetermined node on a network, comprising:

a plurality of directional antennas;

communication control unit that, when a slave node has uplink data packets to be transmitted to a core node and then receives downlink data packets from an uplink node, transmits the uplink data packets to the uplink node that has transmitted the downlink data packets by using a directional antenna through which the downlink data packets were received; and antenna control unit that activates all or a part of the plurality of directional antennas, wherein in a reception waiting state, the antenna control unit activates at least one directional antenna serving for receiving data packets from the uplink node, the data packets having been transmitted periodically and intermittently from the predetermined node, and does not forward the uplink data packet, and upon receiving downlink data packets transmitted from the predetermined node, when the slave node has the uplink data packets, the antenna control unit of the slave node transmits the uplink data packets to the uplink node that has transmitted the downlink data packets by using the directional antenna through which the downlink data packets were received, and if received downlink data packets contain a downlink forwarding data packet to be transmitted to another slave node, the antenna control unit immediately generates a transmission event, activates at least one directional antenna serving for forwarding the downlink forwarding data packet and forwards the downlink forwarding data packet, receives uplink data packets, for the reception waiting state, activates the directional antenna for receiving the downlink data packets, and does not forward the uplink data packets.

9. A packet forwarding method in a network system including a plurality of slave nodes and a core node that transmits data packets to the plurality of slave nodes periodically and intermittently, wherein each of the slave nodes includes a plurality of directional antennas and antenna control unit that activates all or a part of the plurality of directional antennas, the packet forwarding method comprises allowing the antenna control unit of each of the slave nodes to activate, in a reception waiting state, at least one directional antenna serving for receiving, directly or through another slave node, data packets transmitted from the core node and does not forward the uplink data packets, upon receiving downlink data packets transmitted from the core node, when the slave node has uplink data packets to be transmitted to the core node and then receives downlink data packets from an uplink node, communication control unit transmits the uplink data packets to the uplink node that has transmitted the downlink data packets by using a directional antenna through which the downlink data packets were received, if received downlink data packets contain a downlink forwarding data packet to be transmitted to another slave node, the antenna control unit of the slave node immediately generates a transmission event, activates at least one directional antenna serving for forwarding the downlink forwarding data packet and forwards the downlink forwarding data packet, receives uplink data packets, for the reception waiting state, activates the directional antenna for receiving the downlink data packets, and does not forward the uplink data packets.

10. A packet forwarding method implemented in a node in a network system including a plurality of slave nodes and a core node that transmits data packets to the plurality of slave nodes periodically and intermittently, wherein each of the slave nodes includes a plurality of directional antennas and antenna control unit that activates all or a part of the plurality of directional antennas, the packet forwarding method comprises allowing the antenna control unit of each of the slave nodes to activate, in a reception waiting state, at least one directional antenna among the plurality of directional antennas, the at least one directional antenna serving for receiving, directly or through another slave node, data packets transmitted from the core node and does not forward the uplink data packets, upon receiving downlink data packets transmitted from the core node, when the slave node has uplink data packets to be transmitted to the core node and then receives downlink data packets from an uplink node, communication control unit transmits the uplink data packets to the uplink node that has transmitted the downlink data packets by using a directional antenna through which the downlink data packets were received, if received downlink data packets contain a downlink forwarding data packet to be transmitted to another slave node, the antenna control unit of the slave node immediately generates a transmission event, activates at least one directional antenna serving for forwarding the downlink forwarding data packet and forwards the downlink forwarding data packet, receives uplink data packets, for the reception waiting state, activates the directional antenna for receiving the downlink data packets, and does not forward the uplink data packets.

11. A non-transitory recording medium for recording a packet forwarding method in a network system including a plurality of slave nodes and a core node that transmits data packets to the plurality of slave nodes periodically and intermittently, wherein
   each of the slave nodes includes a plurality of directional antennas and antenna control unit that activates all or a part of the plurality of directional antennas,
   the packet forwarding method comprises allowing the antenna control unit of each of the slave nodes to activate, in a reception waiting state, at least one directional antenna serving for receiving, directly or through another slave node, data packets transmitted from the core node and does not forward the uplink data packets,
   upon receiving downlink data packets transmitted from the core node, when the slave node has uplink data packets to be transmitted to the core node and then receives downlink data packets from an uplink node, communication control unit transmits the uplink data packets to the uplink node that has transmitted the downlink data packets by using a directional antenna through which the downlink data packets were received, if received downlink data packets contain a downlink forwarding data packet to be transmitted to another slave node, the antenna control unit of the slave node immediately generates a transmission event, activates at least one directional antenna serving for forwarding the downlink forwarding data packet and forwards the downlink forwarding data packet, receives uplink data packets, for the reception waiting state, activates the directional antenna for receiving the downlink data packets, and does not forward the uplink data packets.

12. The network system according to claim 1, wherein
the antenna control unit of the slave node activates a part of the directional antennas, and
in the reception waiting state, the antenna control unit of the slave node activates only one or a plurality of the directional antennas serving for receiving the downlink data packets.

13. The network system according to claim 1, wherein
in a reception waiting state,
the antenna control unit of each of the slave node activates a part of the plurality of directional antennas, and
the part of the plurality of directional antennas which the antenna control unit of each of the slave node serve for receiving the downlink data packets directly or through another slave node, and
upon receiving downlink data packets transmitted from the core node, if received downlink data packets contain a downlink forwarding data packet to be transmitted to another slave node, the antenna control unit of each of the slave nodes activates at least one directional antenna serving for forwarding the downlink forwarding data packet.

\* \* \* \* \*